United States Patent
Becker

(10) Patent No.: US 8,258,980 B2
(45) Date of Patent: Sep. 4, 2012

(54) METHOD AND DEVICE FOR DRIVER ASSISTANCE BY GENERATING LANE INFORMATION FOR SUPPORTING OF REPLACING LANE INFORMATION OF A VIDEO-BASED LANE INFORMATION DEVICE

(75) Inventor: Jan-Carsten Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 12/227,989

(22) PCT Filed: Jun. 28, 2007

(86) PCT No.: PCT/EP2007/056476
§ 371 (c)(1),
(2), (4) Date: Mar. 11, 2009

(87) PCT Pub. No.: WO2008/019907
PCT Pub. Date: Feb. 21, 2008

(65) Prior Publication Data
US 2009/0167560 A1    Jul. 2, 2009

(30) Foreign Application Priority Data
Aug. 14, 2006    (DE) .......................... 10 2006 038 018

(51) Int. Cl.
*G08G 1/16* (2006.01)
(52) U.S. Cl. ........ 340/903; 340/902; 340/435; 382/104; 382/103; 701/301; 348/148
(58) Field of Classification Search .................. 340/903, 340/902, 905, 435, 436; 382/104, 103; 701/117, 701/96, 301; 348/148
See application file for complete search history.

(56) References Cited

U.S. PATENT DOCUMENTS

| | | | |
|---|---|---|---|
| 7,729,857 B2 * | 6/2010 | Mudalige et al. | 701/301 |
| 7,873,474 B2 * | 1/2011 | Yamamoto et al. | 701/301 |
| 2003/0072471 A1 * | 4/2003 | Otsuka et al. | 382/103 |
| 2004/0138809 A1 | 7/2004 | Mukaiyama | |

FOREIGN PATENT DOCUMENTS

| | | |
|---|---|---|
| DE | 103 49 631 | 5/2005 |
| DE | 103 54 650 | 6/2005 |
| DE | 10 2005 029662 | 1/2006 |
| EP | 1 304 607 | 4/2003 |

OTHER PUBLICATIONS

Toyota, K. et al.: "A proposal of HI (human-oriented image restructuring) system for ITS" Intelligent Vehicles Symposium, 2000. IV 2000. Proceedings of the IEEE Dearborn, MI, USA Oct. 3-5, 2000, Piscataway, NJ, USA, IEEE, US, Oct. 3, 2000, pp. 540-544.

* cited by examiner

*Primary Examiner* — Jennifer Mehmood
*Assistant Examiner* — Hongmin Fan
(74) *Attorney, Agent, or Firm* — Kenyon & Kenyon LLP

(57) ABSTRACT

A method for driver assistance by generating lane information for supporting or for replacing lane information of a video-based lane information device includes: generating the lateral lane information based on the video-based lane information device of the vehicle; ascertaining at least one reliability parameter of the lateral lane information received from the lane information device; receiving navigation system-based lateral lane information from at least one other vehicle via a vehicle-to-vehicle communication device; and supporting or replacing the lateral lane information received from the lane information device based on the received navigation system-based lateral lane information as a function of the ascertained reliability parameter.

8 Claims, 3 Drawing Sheets

METHOD AND DEVICE FOR DRIVER ASSISTANCE BY GENERATING LANE INFORMATION FOR SUPPORTING OF REPLACING LANE INFORMATION OF A VIDEO-BASED LANE INFORMATION DEVICE

BACKGROUND OF THE INVENTION

1. Field of the Invention

The present invention relates to a method and a device for driver assistance by generating lane information for supporting or replacing lane information of a video-based lane information device.

2. Description of Related Art

Driver assistance systems for motor vehicles, in particular driver assistance systems for lateral guidance, exist for increasing comfort and driving safety. Currently, advanced driver assistance systems for lateral guidance are in development or at the preproduction stage, which warn the driver against an unintended departure from the host vehicle's own driving lane (lane departure warning—LDW) or to assist the driver in maintaining the host vehicle's own driving lane while driving (lane keeping support—LKS). The requirements of these systems as regards the accuracy and quality of the lane information are considerably higher than those of driver assistance systems for longitudinal guidance (ACC).

Driver assistance systems for lateral guidance usually operate using a video sensor device. For example, a video camera periodically records an image of the road in front of the vehicle, and the drivable markings are detected in this image by suitable algorithms and are described by a mathematical model. Such video-based sensor systems require an unobstructed view of the lane markings. If the view is entirely or partially obstructed, as is frequently the case in traffic jam situations by vehicles preceding in close proximity, then no or only incomplete lane information is available. Likewise, video-based lane detection often fails if the lane marking is soiled or the paint of the lane marking is old or poorly visible or if there exists no lane marking at all.

A modern motor vehicle usually has a steering angle sensor, a yaw rate sensor and acceleration sensors, by which it is possible to estimate or extrapolate the current vehicle movement using a vehicle model. In particular, using the yaw rate signal of the yaw rate sensor it is possible to determine at any time the curvature of the course which the vehicle is currently traveling.

Navigation devices for motor vehicles have a device for determining the vehicle position, which is normally GPS-based, by which the current position of the vehicle may be determined with an accuracy of a few meters.

Systems for vehicle-to-vehicle communication are currently in development. An example of this is the "Car-2-Car Communication Consortium" (C2C CC), to which the automobile manufacturers Audi, BMW/Mini, DaimlerChrysler, Fiat, Renault and Volkswagen belong. In addition to working out an open industry standard for the communication between vehicles and between vehicles and infrastructure facilities at the European level, the "C2C CC" is supposed to advance the allocation of a radio frequency required for this purpose and develop and test appropriate radio systems.

One exemplary embodiment for the vehicle-to-vehicle communication is the specific transmission of information to other drivers. If a vehicle gets into a critical situation, for example, such as a traffic jam, fog, icy roadway, an accident or the like, it transmits respective information to all affected road users in the immediate vicinity of the danger spot. The following traffic is warned in time and is able to react appropriately to the situation. In such a spontaneous information network, each vehicle may take on the role of transmitter, receiver or router. This results in the formation of a chain of information similar to a relay race. By such a "multi-hopping" method, the information may be passed on over a larger distance. The data exchange between the vehicles is realized using "ad hoc networks". These short-distance connections build up spontaneously between vehicles as needed, are self-organizing and require no external infrastructure for this purpose. The WLAN technology known from computer systems forms the technological basis for this purpose.

Additionally there exist methods and devices for ascertaining lane course data from detections of preceding vehicles by object-detecting sensors such as e.g. radar, lidar or video, as disclosed, for example in DE 103 54 650 A1 or DE 103 49 631 A1. These sensors, however, have a very limited detection range tailored to their proper task. Furthermore, these sensors detect all types of objects, which requires an additional discrimination between objects relevant for lane support and objects not relevant for lane support.

Digital maps for vehicle navigation systems have a resolution and an accuracy that is sufficient for the navigation function, but that is by far not sufficient for future driver assistance systems, for example, for lateral guidance in the driving lane. Furthermore, digital maps for vehicle navigation systems, which are currently normally stored on storage media such as CDs or DVDs, for example, are fundamentally obsolete at the time they are in use since they store only the data record that was valid at the time of their production.

BRIEF SUMMARY OF THE INVENTION

The present invention provides valuable support to the driver by supporting or replacing video-based lane information by navigation-based position data and/or movement data and/or lane data from other vehicles via vehicle-to-vehicle communication in situations in which the lane markings are partially or completely covered and in which there is thus a partial or complete failure of the video-based lane information system.

The idea underlying the present invention is to generate lane information in the event of a failure of a video-based lane detection system or for supporting a video-based lane detection system by movement data from other vehicles via a vehicle-to-vehicle communication device, in particular for traffic jam situations in which frequently the lane is covered by preceding vehicles and thus the video-based lane detection fails partially or entirely.

According to a refinement, the reliability parameter includes a quality and/or a range.

According to a refinement, the navigation system-based lane information is received from a plurality of other vehicles via the vehicle-to-vehicle communication device and is fitted to a predefined lane model.

According to a refinement, navigation system-based lane information is received from at least one oncoming vehicle via the vehicle-to-vehicle communication device and is transformed to the host vehicle's own lane.

According to a refinement, the navigation system-based lane information from the plurality of other vehicles is assigned a respective identification corresponding to the other vehicle that transmits it.

According to a refinement, the navigation system-based lane information from the plurality of other vehicles are subjected to a plausibilization with respect to the direction of travel.

DETAILED DESCRIPTION OF THE INVENTION

Figure 1:
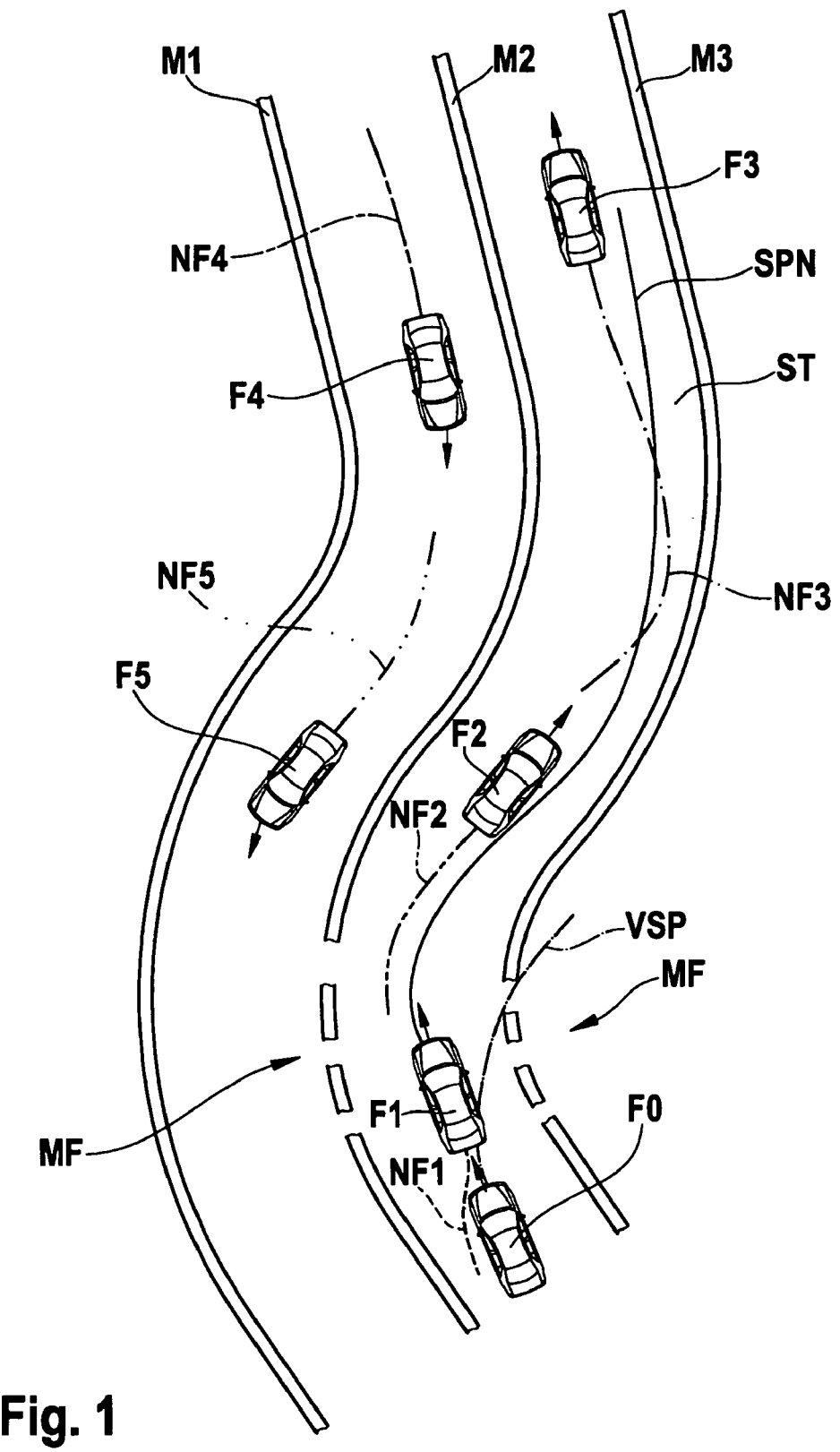
FIG. 1 shows a depiction of a traffic situation to explain a specific embodiment of the method according to the present invention for assisting a driver by generating lane information for supporting or for replacing lane information of a video-based lane information device.

FIG. 1 shows a depiction of a traffic situation for explaining a specific embodiment of the method according to the present invention for assisting a driver by generating lane information for supporting or for replacing lane information of a video-based lane information device.

Figure 2:
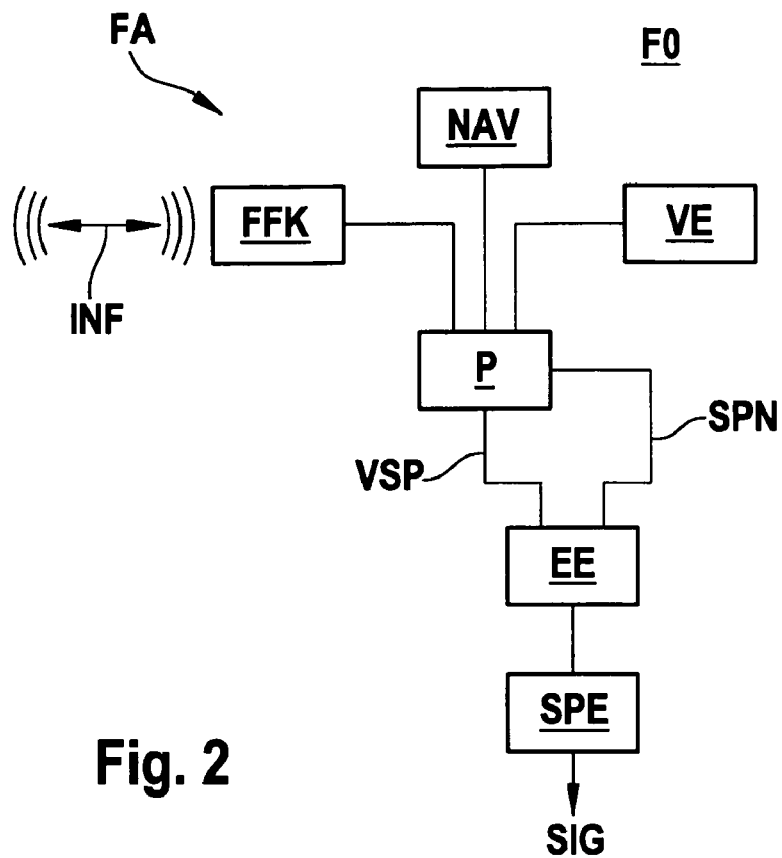
FIG. 2 shows a block diagram for explaining a specific embodiment of the device according to the present invention for assisting a driver by generating lane information for supporting or for replacing lane information of a video-based lane information device.

Reference symbol ST in FIG. 1 indicates a roadway having lane markings M1, M2, M3. In the direction of travel of a vehicle F0, which is equipped with a driver assistance system FA having a navigation system NAV, a vehicle-to-vehicle communication device FFK and a video-based lane detection device VE (see FIG. 2), M1 indicates the left side strip, M2 the central strip and M3 the right side strip. Reference symbol MF indicates a region, in which central strip M2 is not visible for video-based lane detection device VE of vehicle F0 because it is soiled. In this region MF, video-based lane detection device VE of vehicle F0 also cannot see right side marking M3, which does indeed exist, but which is covered for video-based lane detection device VE by very closely preceding vehicle F1.

Thus, a processing device P of driver assistance system FA of Vehicle F0 provides a video-based predicted lane VSP, which reproduces the actual course of roadway ST well only at short range, but which deviates greatly from the course of roadway ST in the long range, as may be seen clearly in FIG. 1.

Figure 3:
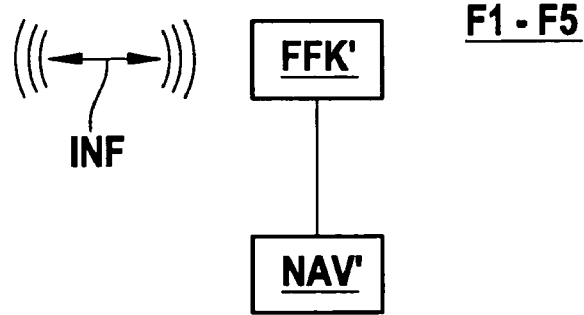
FIG. 3 shows another block diagram for explaining the specific embodiment of the device according to the present invention for assisting a driver by generating lane information for supporting or for replacing lane information of a video-based lane information device.

Vehicles F1, F2, F3, F4, F5, which are equipped with a navigation system NAV' and a corresponding vehicle-to-vehicle communication device FFK', as shown in FIG. 3, transmit at regular intervals lane information INF about their vehicle state, in particular their absolute position, direction and the yaw rate to vehicle-to-vehicle communication device FFK of vehicle F0. Optionally, but not necessarily, if, for example, there is a conflict with privacy protection considerations, vehicles F1 through F5 transmit a definite identification along with information INF in order to allow vehicle F0 to assign data of different times to a particular vehicle. Vehicle F0 likewise transmits its own lane information INF about the vehicle state, in particular the lateral position on roadway ST detected by video-based lane detection device VE and, on multilane roads, the lane that is traveled, in so far as this may be determined.

If sufficient transmission bandwidth is available, the respective detected lane course of vehicles F0-F5 is likewise transmitted with information INF over vehicle-to-vehicle communication device FFK in a suitable curve shape, e.g. as a polyline, second-order or third-order polynomial, spline or the like together with the detecting range. Such curves are indicated in FIG. 1 by NF1-NF5 corresponding to vehicles F1-F5.

The other vehicles F1 through F5 receive this lane information INF of vehicle F0 and relay it in turn to other vehicles (not shown), it being conceivably an additional criterion that only data from vehicles within a certain distance are relayed in order to limit the quantity of data and to ensure the immediate validity of the data.

Vehicle F0, which requires additional lane information INF from vehicles F1-F5 for its driver assistance system FA for lateral vehicle guidance, receives the above-mentioned lane information INF of the other vehicles F1 through F5, a filtering of the data being conceivable such that, for example, data are received/evaluated only from vehicles that are located, for example, within a certain distance or that move in a certain direction (for example, in the host vehicle's own direction).

From the received and possibly filtered lane information INF, processing device P of driver assistance system FA of vehicle F0 calculates a navigation-based lane SPN, which is indicated in FIG. 1 by the solid line.

On the basis of predefined criteria, an ascertainment device EE of driver assistance system FA of vehicle F0 compares the quality of video-based lane data VSP and the quality of navigation system-based lane data SPN, e.g. criterion of accuracy of prediction or range of prediction.

In the situation shown in FIG. 1, ascertainment device EE of driver assistance system FA of vehicle F0 arrives at the result that, on account of the small number of interpolation points, video-based lane data VSP provide a substantially inferior prediction than navigation system-based lane data SPN.

Vehicle F0 therefore draws on the navigation system-based lane data SPN for the purpose of predicting the lane using a lane prediction device SPE. In this connection, the absolute position, direction and change of direction (ascertainable from the respective directly measured vehicle yaw rate) of the other vehicles F1 through F5 are interpreted as interpolation points in a virtual map and are stored in a list. For ascertaining the lane prediction, in addition, the lane data of oncoming vehicles F4, F5 may be transformed from the lane of oncoming traffic to the host vehicle's own lane, a previously determined lane width, for example, being drawn upon for this purpose.

In the present case, the lane data transmitted from vehicles F4, F5 will be discarded following a plausibilization since they do not fit with the host vehicle's own direction of travel or lane. Using the interpolation points NF1, NF2, NF3 of vehicles F1-F3 assigned to the host vehicle's own lane, the final navigation system-based lane data SPN are ascertained and continuously adapted using a curve regression, the selection of the suitable curve shape (for example, polyline, second-order or third-order polynomial, splines or the like) depending both on driver assistance system FA as well as on the predictive range. For this purpose, the system of equations for the curve regression, which is initially made exclusively of equations that describe the interpolation point position itself, may be expanded by additional equations for the first and second derivation at each interpolation point in order to map the direction and change of direction (yaw rate).

From the transmitted lane data and/or depending on the accuracy of the position data and depending on navigation system NAV' it is possible to predict the course of roadway ST more accurately from the collective movement of vehicles F1-F3 by the respective data than from the limited data record of video-based lane detection device VE.

If a definite vehicle identification is transmitted along with the data, then it is possible to track the movement of the vehicles over time as well and thus to ascertain movement trajectories. These trajectories may be helpful for allocating the lanes, but are not necessary.

By examining errors separately for each equation of the curve regression it is possible to identify equations that have a particularly great error with respect to the compensating curve. The associated vehicles normally do not follow the collective movement of the other vehicles on this lane, for example when a vehicle turns off in an entrance ramp, while the other vehicles continue to follow the course of the road, and may thus be excluded from the calculation of the lane prediction by lane prediction device SPE in order to improve the curve description.

If lane prediction device SPE determines a deviation of the actual lane from the respectively predicted lane, then it emits a warning signal SIG to the driver.

Depending on the application as well as the number and quality of the available data of vehicles F1 through F5 it is possible to use the ascertained compensation curves to supplement or replace the lane information of video-based sensor device VE in the event of a partial failure of the video-based lane detection device, as in the present case in marking region MF. The duration of the supplementation or replacement is possible by assessing the quality of video-based lane data VSP. In the present case, after passing marking failure region MF, vehicle F0 and, if there is a sufficient distance to vehicle F1, lane prediction device SPB may therefore base the lane prediction data again entirely on video-based lane detection device VP.

Figure 4:
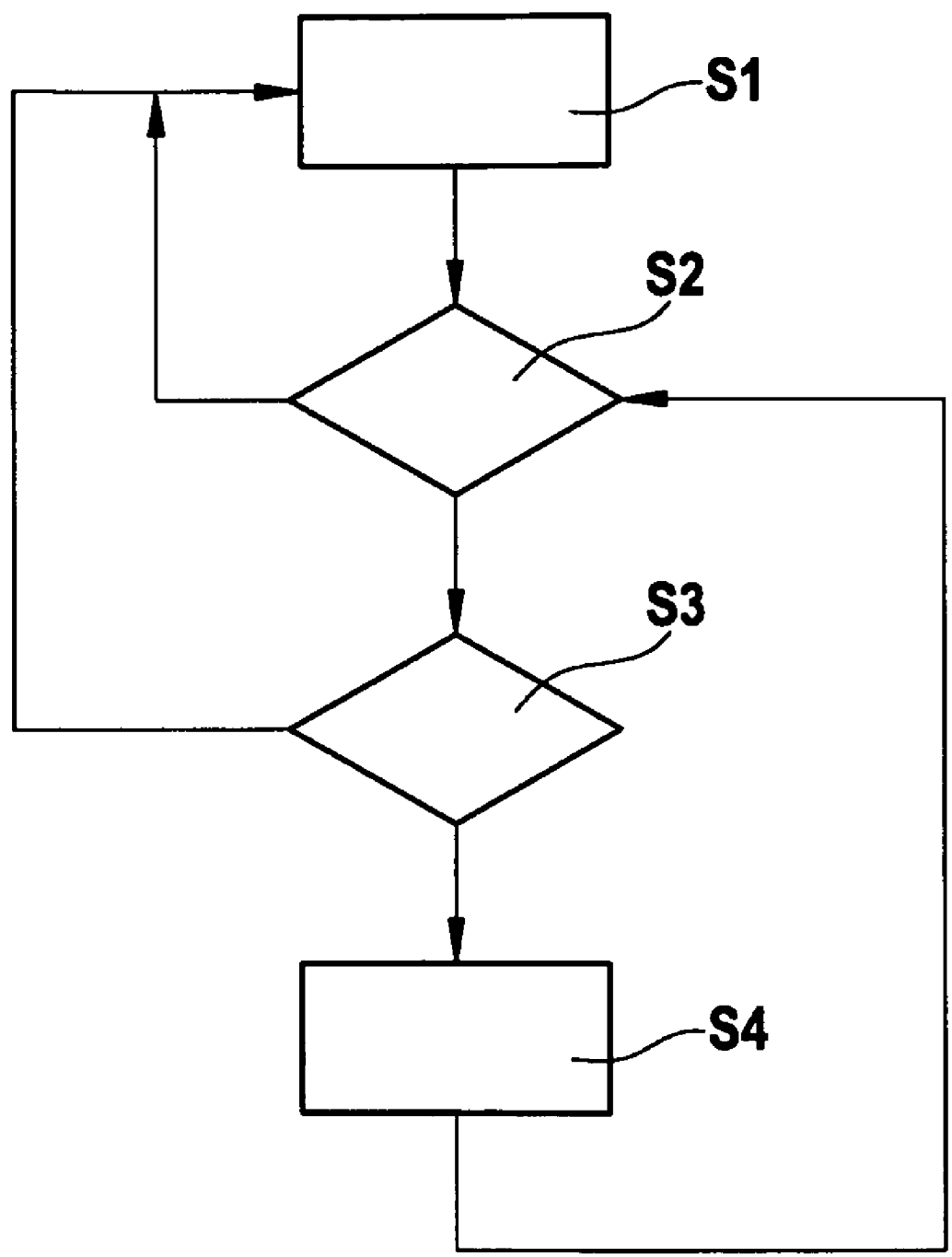
FIG. 4 shows a flow chart for explaining the essential steps of the specific embodiment of the method according to the present invention for assisting a driver by generating lane information for supporting or for replacing lane information of a video-based lane information device.

The underlying method is now explained with reference to FIG. 4, which shows a flow chart for explaining the essential steps of the specific embodiment of the method according to the present invention for driver assistance by generating lane information for supporting or for replacing lane information of a video-based lane information device by ascertainment device EE.

The video-based lane prediction using lane information VSP is activated in step S1. A check is performed in step S2, whether the video-based lane prediction corresponds to the predefined quality criterion. If this is the case, then the method branches back to step S1. Otherwise, a check is performed in step S3, whether navigation-based lane information from other vehicles, such as e.g. F1-F5, are available. If this is not the case, then the method branches back to step S1. Otherwise, the navigation-based lane prediction using lane information SPN is activated in step S4. Subsequently, the method branches back to step S2.

What is claimed is:

1. A method for driver assistance by generating lane information for a host vehicle, comprising:
    generating lateral lane information using a video-based lane information device of the host vehicle;
    ascertaining at least one reliability parameter of the lateral lane information generated from the video-based lane information device;
    receiving additional lane information from a navigation system of at least one other vehicle via a vehicle-to-vehicle communication device, wherein the additional lane information includes absolute position, direction and yaw rate of the at least one other vehicle; and
    one of adjusting or replacing the lateral lane information generated from the video-based lane information device based on the received additional lane information as a function of the at least one reliability parameter;
    wherein the additional lane information is received from at least one oncoming vehicle via the vehicle-to-vehicle communication device, and wherein the additional lane information is transformed to the host vehicle's own lane.

2. The method as recited in claim 1, wherein the at least one reliability parameter includes a range parameter.

3. The method as recited in claim 1, wherein the additional lane information is assigned a respective identifier identifying a corresponding vehicle transmitting the additional lane information.

4. The method as recited in claim 1, wherein the additional lane information is subjected to a plausibility test with respect to a direction of travel.

5. A device for driver assistance by generating lane information for a host vehicle, comprising:
    a video-based lane information device configured to generate lateral lane information;
    an ascertainment device configured to ascertain at least one reliability parameter of the lateral lane information received from the lane information device; and
    a vehicle-to-vehicle communication device configured to receive additional lane information from at least one other vehicle, wherein the additional lane information includes absolute position, direction and yaw rate of the at least one other vehicle;
    wherein the ascertainment device triggers one of adjusting or replacing of the lateral lane information generated from the video-based lane information device based on the received additional lane information as a function of the at least one reliability parameter;
    wherein the additional lane information is received from at least one oncoming vehicle via the vehicle-to-vehicle communication device, and wherein the ascertainment device is configured to transform the additional lane information to the host vehicle's own lane.

6. The device as recited in claim 5, wherein the at least one reliability parameter includes a range parameter.

7. The device as recited in claim 5, wherein the additional lane information is assigned a respective identifier identifying a corresponding vehicle transmitting the additional lane information.

8. The device as recited in claim 5, wherein the additional lane information is subjected to a plausibility test with respect to a direction of travel.

* * * * *